United States Patent
Yu

(10) Patent No.: US 7,046,820 B2
(45) Date of Patent: May 16, 2006

(54) METHODS FOR DIGITAL WATERMARKING OF IMAGES AND IMAGES PRODUCED THEREBY

(75) Inventor: Hong Heather Yu, Princeton Jct., NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 618 days.

(21) Appl. No.: 10/195,233

(22) Filed: Jul. 16, 2002

(65) Prior Publication Data

US 2004/0013284 A1    Jan. 22, 2004

(51) Int. Cl.
G06K 9/00    (2006.01)
G06K 15/00   (2006.01)
H04N 1/40    (2006.01)

(52) U.S. Cl. ..................................... 382/100; 358/3.28
(58) Field of Classification Search ................ 382/100; 358/3.28
See application file for complete search history.

(56) References Cited

U.S. PATENT DOCUMENTS

| | | | |
|---|---|---|---|
| 5,073,925 A | | 12/1991 | Nagata et al. |
| 5,915,027 A | | 6/1999 | Cox et al. |
| 6,181,802 B1 | * | 1/2001 | Todd .......................... 382/100 |
| 2002/0015508 A1 | * | 2/2002 | Hannigan et al. ........... 382/100 |
| 2002/0191812 A1 | * | 12/2002 | Kim ........................... 382/100 |
| 2003/0202678 A1 | * | 10/2003 | Silverstein .................. 382/100 |

OTHER PUBLICATIONS

U.S. Appl. No. 09/427,321, filed Oct. 26, 1999, Yu et al.
U.S. Appl. No. 09/691,544, filed Oct. 18, 2000, Yu et al.
M. Ramkumar, A.N. Akansu: "Information Theoretic Bounds for Data Hiding in Compressed Images", IEEE 2nd Multimedia Signal Processing Workshop, 1998, 6 pages.
I. Cox, J. Kilian, T. Leighton, T. Shamoon: "Secure Spread Spectrum Watermarking for Multimedia", NEC Research Institute, Technical Report 95-10, 33 pages, 1995.
C. Podilchuk, W. Zeng: "Image Adaptive Watermarking Using Visual Models", IEEE Journal Selected Areas of Communications (JSAC), vol. 16, No. 4, pp. 525-539, May, 1998.
A. Herrigel, J.O Ruanaidh, H. Pertersen, S. Pereira, T. Pun: "Secure Copyright Protection Techniques for Digital Images", Second Info. Hiding Workshop, 1998, 22 pages.
W. Zeng, B. Liu: "On Resolving Rightful Ownership of Digital Images by Invisible Watermarks", ICIP, 1997, 4 pages.

(Continued)

*Primary Examiner*—Jingge Wu
*Assistant Examiner*—Anthony Mackowey
(74) *Attorney, Agent, or Firm*—Harness, Dickey & Pierce, PLC

(57) ABSTRACT

The computer analyzes a representation of a digitized image to determine contiguous edges of the image; select edges for modulation in accordance with a data hiding criterion; apply a watermark-dependent edge point modulation to pixels on the selected edges; and wherein said analyzing to determine contiguous edges produces lists of pixel pointers, each list containing pointers to pixel locations of a contiguous edge; and wherein said criterion selects lists corresponding to low contrast, low smoothness edges.

10 Claims, 9 Drawing Sheets

OTHER PUBLICATIONS

E. Koch, J. Zhao: "Towards Robust and Hidden Image Copyright Labeling", IEEE Workshop on Nonlinear Signal and Image Processing, Neos Marmaras, Greece, 4 pages, Jun. 20-22, 1995.

M.D. Swanson, B. Zhu, A.H. Tewfik: "Robust Data Hiding for Images", IEEE DSP Workshop (DSP 96), Loen, Norway, pp. 37-40, Sep. 1996.

W.Zeng, B. Liu, S. Lei: "Extraction of Multiresolution Watermark Images for Resolving Rightful Ownership", Electronic Imaging '99, Proc. of SPIE, vol. 3657, 11 pages, 1999.

M. Wu, B. Liu: "Digital Watermarking Using Shuffling", 5 pages, date not available.

* cited by examiner

FIG. 4

| q\p | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | 2 | 2 | 2 | 3 | 3 | 3 | 3 | 3 | 3 | 3 | 3 | 3 | 3 | 3 | 3 | 3 | 4 | 4 | 4 | 4 |
| 2 | 2 | 2 | 2 | 3 | 3 | 3 | 3 | 3 | 3 | 3 | 3 | 3 | 3 | 3 | 3 | 4 | 4 | 4 | 4 | 4 |
| 3 | 2 | 2 | 2 | 2 | 3 | 3 | 3 | 3 | 3 | 3 | 3 | 3 | 3 | 3 | 3 | 4 | 4 | 4 | 4 | 4 |
| 4 | 2 | 2 | 2 | 2 | 3 | 3 | 3 | 3 | 3 | 3 | 3 | 3 | 3 | 3 | 3 | 4 | 4 | 4 | 4 | 4 |
| 5 | 2 | 2 | 2 | 2 | 3 | 3 | 3 | 3 | 3 | 3 | 3 | 3 | 3 | 3 | 3 | 4 | 4 | 4 | 4 | 4 |
| 6 | 2 | 2 | 2 | 2 | 3 | 3 | 3 | 3 | 3 | 3 | 3 | 3 | 3 | 3 | 3 | 4 | 4 | 4 | 4 | 4 |
| 7 | 3 | 2 | 2 | 2 | 2 | 2 | 1 | 1 | 1 | 1 | 1 | 1 | 1 | 0 | 0 | 0 | 0 | 0 | 0 | 0 |
| 8 | 3 | 2 | 2 | 2 | 2 | 2 | 2 | 1 | 1 | 1 | 1 | 1 | 1 | 1 | 0 | 0 | 0 | 0 | 0 | 0 |
| 9 | 3 | 2 | 2 | 2 | 2 | 2 | 2 | 1 | 1 | 1 | 1 | 1 | 1 | 1 | 0 | 0 | 0 | 0 | 0 | 0 |
| 10 | 3 | 2 | 2 | 2 | 2 | 2 | 2 | 1 | 1 | 1 | 1 | 1 | 1 | 1 | 0 | 0 | 0 | 0 | 0 | 0 |
| 11 | 3 | 2 | 2 | 2 | 2 | 2 | 2 | 1 | 1 | 1 | 1 | 1 | 1 | 1 | 0 | 0 | 0 | 0 | 0 | 0 |
| 12 | 3 | 2 | 2 | 2 | 2 | 2 | 2 | 1 | 1 | 1 | 1 | 1 | 1 | 1 | 0 | 0 | 0 | 0 | 0 | 0 |

FIG. 5

| q\p | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| 1 | 0 | 4 | 2 | 3 | 0 | 4 | 4 | 4 | 4 | 4 | 4 | 4 | 0 | 4 | 3 | 3 | 4 | 4 | 4 | 4 |
| 2 | 4 | 0 | 2 | 3 | 4 | 4 | 0 | 0 | 4 | 0 | 4 | 4 | 4 | 4 | 3 | 4 | 4 | 4 | 4 | 4 |
| 3 | 4 | 0 | 4 | 0 | 4 | 4 | 0 | 0 | 4 | 4 | 4 | 4 | 4 | 4 | 3 | 4 | 4 | 4 | 4 | 4 |
| 4 | 0 | 4 | 0 | 4 | 0 | 4 | 4 | 4 | 4 | 4 | 0 | 0 | 4 | 3 | 3 | 4 | 4 | 4 | 4 | 4 |
| 5 | 4 | 0 | 4 | 0 | 2 | 3 | 4 | 4 | 0 | 4 | 4 | 4 | 4 | 3 | 4 | 4 | 4 | 4 | 4 | 4 |
| 6 | 0 | 4 | 0 | 4 | 2 | 3 | 0 | 4 | 4 | 4 | 4 | 0 | 4 | 0 | 3 | 4 | 4 | 4 | 4 | 4 |
| 7 | 3 | 2 | 0 | 4 | 4 | 0 | 1 | 1 | 0 | 0 | 0 | 0 | 1 | 0 | 0 | 0 | 0 | 0 | 0 | 0 |
| 8 | 3 | 2 | 4 | 0 | 0 | 4 | 2 | 1 | 0 | 4 | 0 | 4 | 1 | 1 | 0 | 0 | 0 | 0 | 0 | 0 |
| 9 | 3 | 2 | 4 | 0 | 4 | 0 | 2 | 1 | 0 | 0 | 4 | 0 | 4 | 0 | 0 | 0 | 0 | 0 | 0 | 0 |
| 10 | 3 | 2 | 0 | 4 | 0 | 4 | 2 | 1 | 4 | 0 | 0 | 0 | 0 | 0 | 0 | 0 | 0 | 0 | 0 | 0 |
| 11 | 3 | 2 | 0 | 4 | 0 | 4 | 2 | 1 | 4 | 0 | 0 | 0 | 0 | 0 | 0 | 0 | 0 | 0 | 0 | 0 |
| 12 | 3 | 2 | 4 | 0 | 0 | 4 | 2 | 1 | 0 | 4 | 0 | 4 | 0 | 0 | 0 | 0 | 0 | 0 | 0 | 0 |

DENSITY 0

MAPPING

DENSITY 1

DENSITY 2

DENSITY 3

DENSITY 4

METHODS FOR DIGITAL WATERMARKING OF IMAGES AND IMAGES PRODUCED THEREBY

FIELD OF THE INVENTION

The present invention relates generally to methods for digital watermarking of images and graphics and the watermarked images produced thereby, and more particularly to methods and apparatus for digital watermarking of low texture images and graphics and the watermarked images produced thereby.

BACKGROUND OF THE INVENTION

With the increasing spread in electronic commerce, there has been a commensurate increase in electronic copying technology. Digital copy technology such as DVD-R, DVD-RW, CD-R and CD-RW is now widely available. In addition, paper copying machines, facsimile machines, and electronic scanners have long been available. Ensuring the protection of electronic and printed media from unauthorized copying and modification continues to become more important as electronic commerce continues to spread into every area of the national economy.

Data hiding is one form of content protection that is sometimes employed for copy control and copyright protection. Embedding of data such as a watermark onto a host medium or image is one example of data hiding. An embedded watermark is typically intended to provide copyright control and/or access control of a product.

Suitable methods for embedding watermarks in images are known for color or gray scale images that contain a substantial amount of texture. These methods rely upon the human eye's ability to tolerate noises in high texture regions of an image. One such technique utilizes a Just Noticeable Difference (JND) function to determine where information can be hidden in an image. The JND function may, for example, lead to the embedding of watermark information in a region of a portrait that depicts hair. Without the JND function determination, the watermark may be embedded in a region of the same halftone portrait that depicts the face of the subject. Because the human eye is sensitive to noise in smooth regions of an image, the latter case is likely to result in easily observed visible artifacts.

Although many images have sufficient texture to hide an embedded watermark from human eyes, there are types of images, such as comic strips and clip art images, that do not have sufficient texture for this purpose due to their relative simplicity. Many of these images are simple compositions of groups of smooth regions that cannot withstand the "noise" added by known watermarking techniques without perceptible degradation. Thus, not many copyrighted low texture images have been provided with watermark protection.

SUMMARY OF THE INVENTION

One configuration of the present invention therefore provides a method for watermarking an image utilizing a computer. The computer is utilized to: step through multipixel blocks of a digitized image having regions of a plurality of different densities; analyze the multipixel blocks of the digitized image to determine whether the multipixel blocks of the digitized image are replaceable with coded blocks indicative of a watermark code, wherein the replaceable multipixel blocks are thus codable blocks; and substitute coded blocks indicative of a watermark for codable blocks of the digitized image.

Another configuration of the present invention provides a method for watermarking an image utilizing a computer, wherein the computer is utilized to replace pixels of the image with a code representing a symbol having an apparent printed density corresponding to the density of the replaced pixel, and to select the symbol from a plurality of symbols having equivalent printed densities depending upon a watermark symbol being encoded at a location of a replaced pixel.

Still another configuration of the present invention provides a method for watermarking an image utilizing a computer, wherein the computer is utilized to: analyze a representation of a digitized image to determine contiguous edges of the image; select edges for modulation in accordance with a data hiding criterion; and apply a watermark-dependent edge point modulation to pixels on the selected edges.

Yet another configuration of the present invention provides a method for watermarking an image utilizing a computer. The method utilizes the computer to: analyze a representation of a digitized image to determine border lines within an image; select border lines for modulation in accordance with a data hiding criterion; and apply a watermark-dependent border point modulation to pixels in the selected border lines.

Still another configuration of the present invention provides a method for watermarking a color image utilizing a computer. The method includes utilizing the computer to: step through multipixel blocks of a digitized color image having regions of a plurality of different colors; analyze the multipixel blocks of the digitized image to determine whether the multipixel blocks of the digitized image are replaceable with coded blocks indicative of a watermark code, the replaceable multipixel blocks thereby being codable blocks; and substitute coded blocks indicative of a watermark for codable blocks of the digitized image.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a representation of a simple digitized image, in which halftone values of each pixel of the image are shown in their array locations.

FIG. 5 is a representation of the digitized image of FIG. 4 in which a watermark has been embedded.

DETAILED DESCRIPTION OF THE PREFERRED EMBODIMENTS

The following description of the preferred embodiment(s) is merely exemplary in nature and is in no way intended to limit the invention, its application, or uses.

In one configuration of the present invention, by coding a low texture image into a series of binary values 0 and 1, watermarks are inserted imperceptibly, in a manner that is resistant to scaling, random noise, and copying. An example of a low texture image in which a watermark may be inserted utilizing one configuration of the present invention is a cartoon drawing that includes at least one gray shade covering an area large enough in which to embed a watermark. The area covered need not be contiguous and the embedded watermark need not be confined solely within one gray shade. Thus, this configuration is suitable for embedding watermarks in many existing drawings that include only a limited number of halftone shades or in newly prepared drawings that utilize a limited number of halftone shades.

Figure 1A:
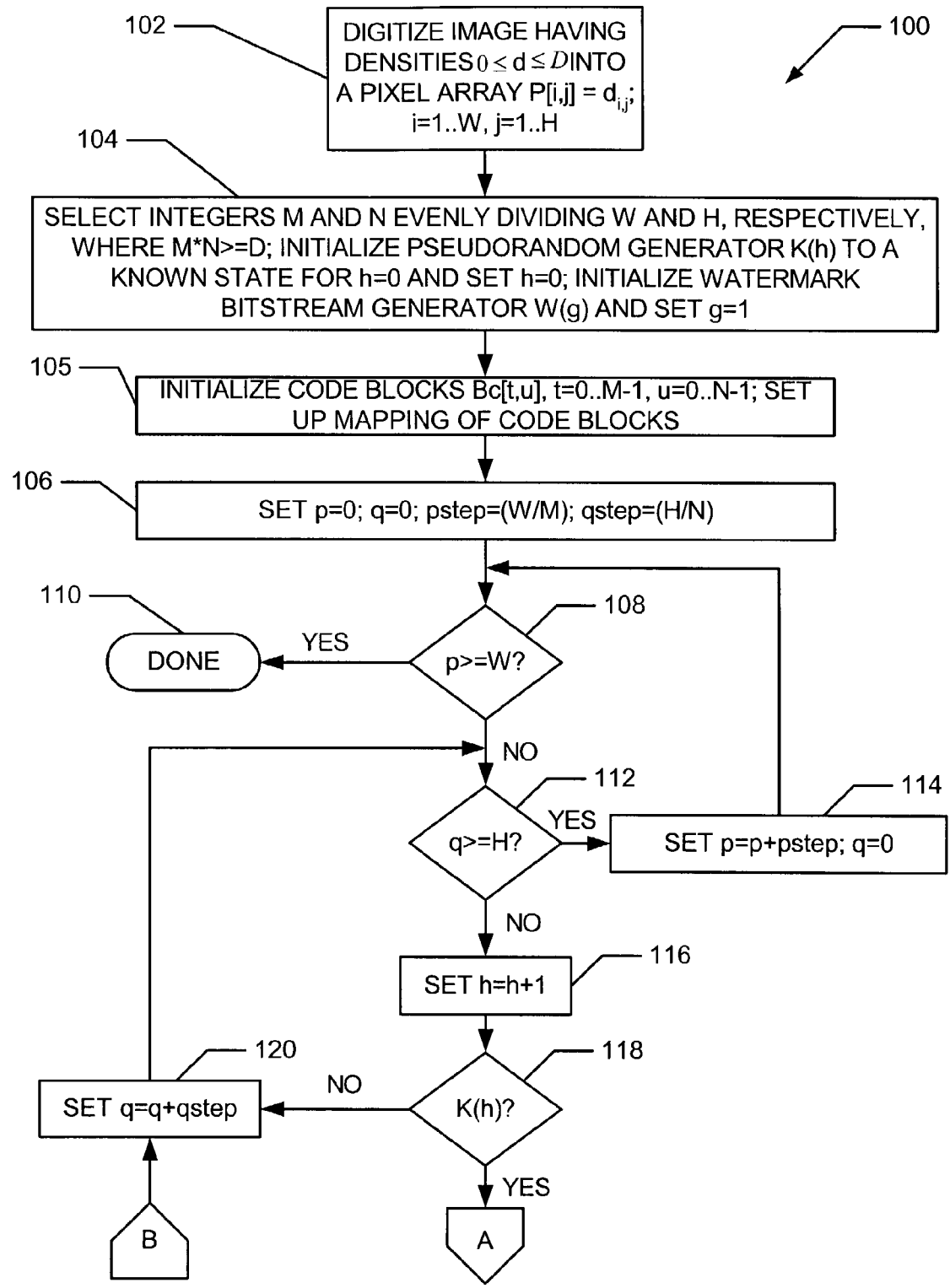
FIG. 1 is a flowchart representing one configuration of a method for electronically embedding a watermark in a low texture halftone image.
Figure 1B:
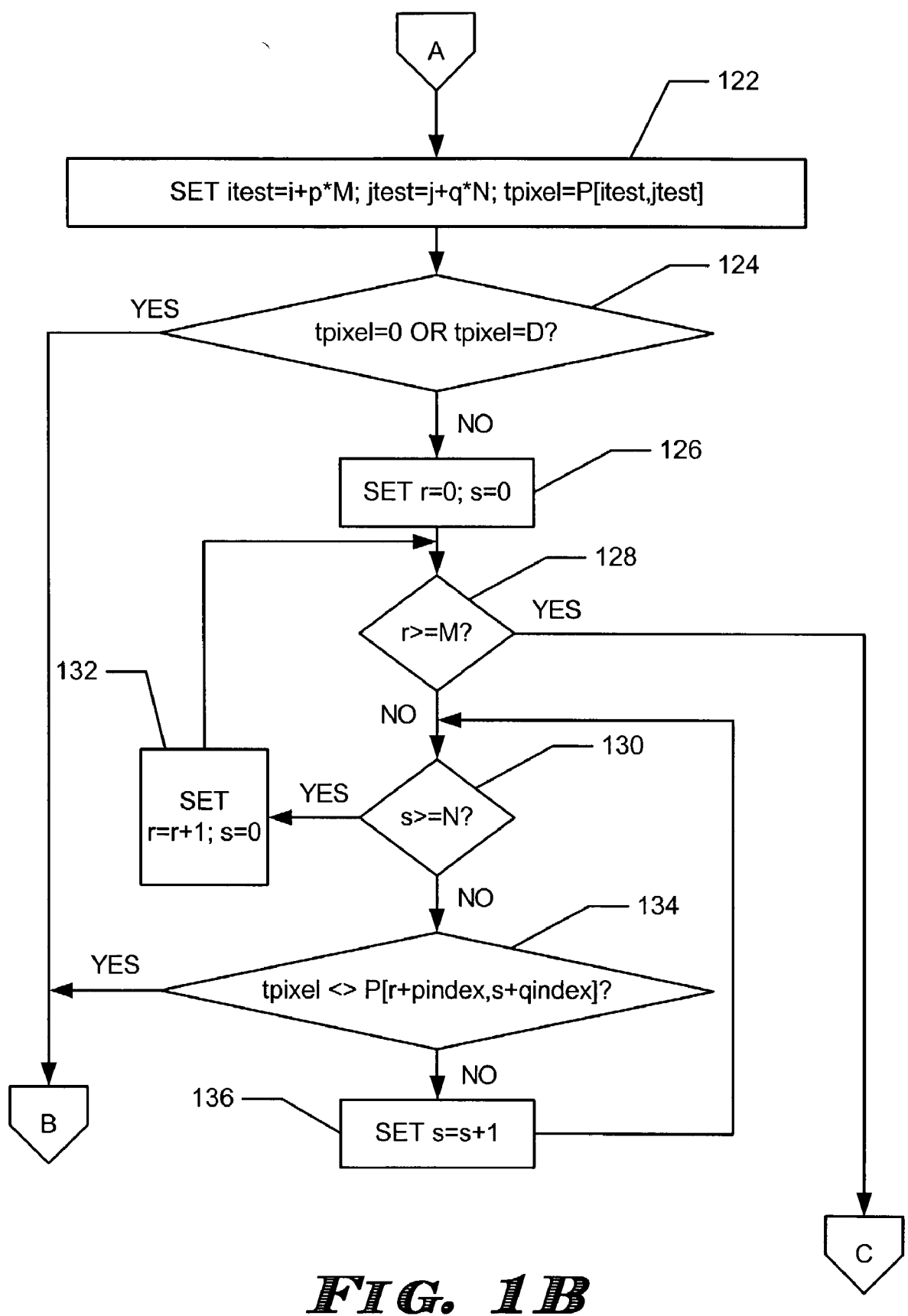
Figure 1C:
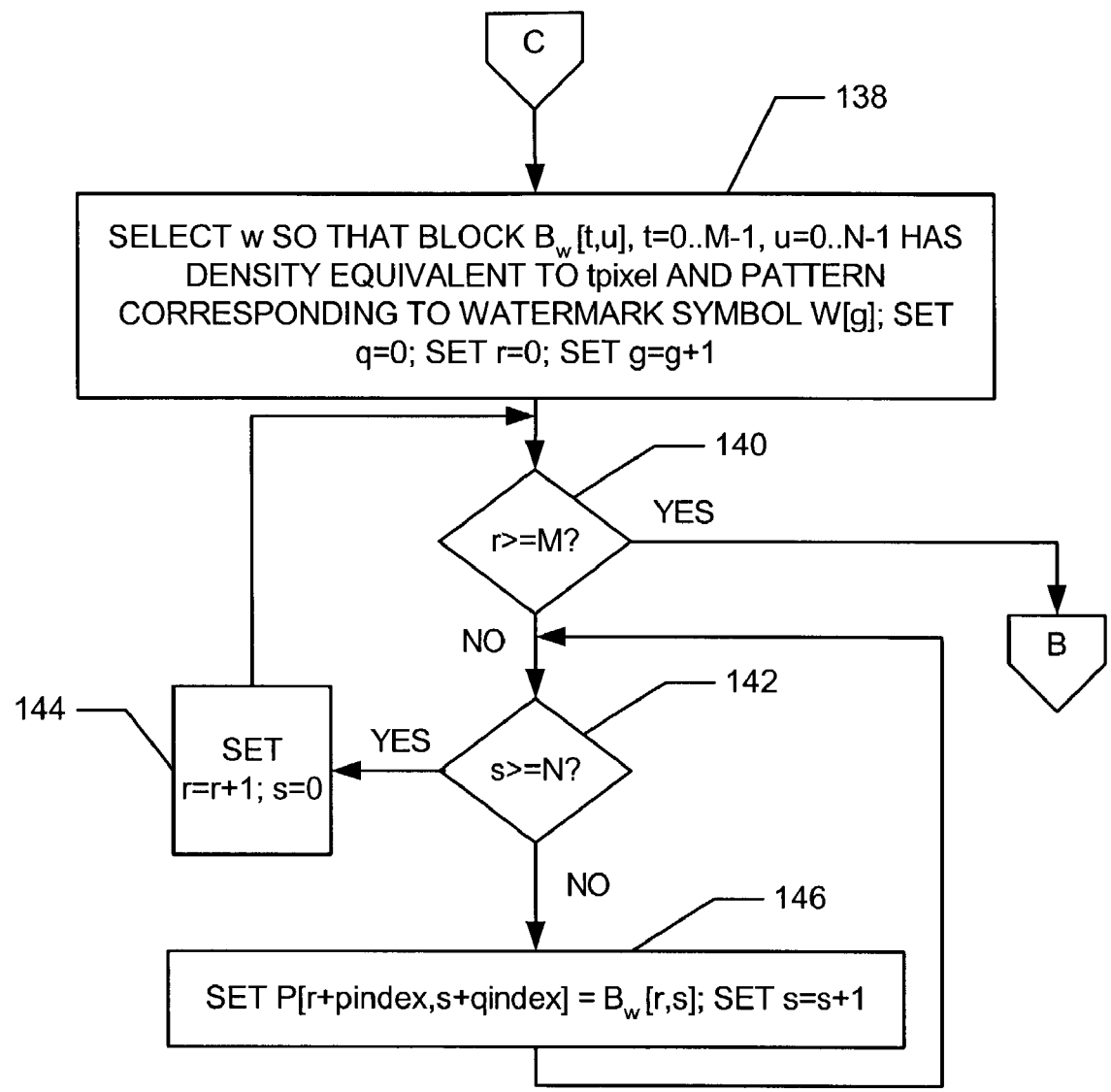

In one configuration and referring to flow chart 100 of FIG. 1, a low density halftone image having a discrete spectrum of densities d representable by consecutive integers ranging from 0 to D is digitized 102 into a pixel array P[i,j], where i is an integer index between 1 and W (the width of the image in pixels) and j is an integer index between 1 and H (the height of the image in pixels). In general, P[i,j]=$d_{i,j}$, where $d_{i,j}$ represents the density at pixel coordinate i,j. Note that for a printed monochrome image, the ratio $d_{i,j}/D$ represents the corresponding ratio of ink coverage, i.e., a density ratio of 0.25 represents a halftone area in which ink dots cover 25% of the area.

For the selected image, small integers M and N are selected 104 that evenly divide W and H, respectively. These small integers represent the dimensions of rectangular groups of pixels in the image to be coded with bits of a watermark. In one configuration, to ensure that the code is applied to two-dimensional areas of the drawing, both M and N are greater than 1, but are selected so that there are many M by N blocks of pixels (i.e., multipixel blocks) in the drawing. Also in one configuration, M and N are selected so that their product is greater than or equal to D, the largest integer needed to represent the densities in the drawing. A watermark generator W(g) configured to generate a stream of ones and zeros is also initialized, and in one configuration, a pseudorandom generator K(h) is initialized to a known state. The variable h is initialized to 0 and the variable g is initialized to 1. (The choice of whether to initialize a counter to 0 or 1 is often a design decision within the capability of a programmer, as long as the counter is used consistently.)

Figure 2:
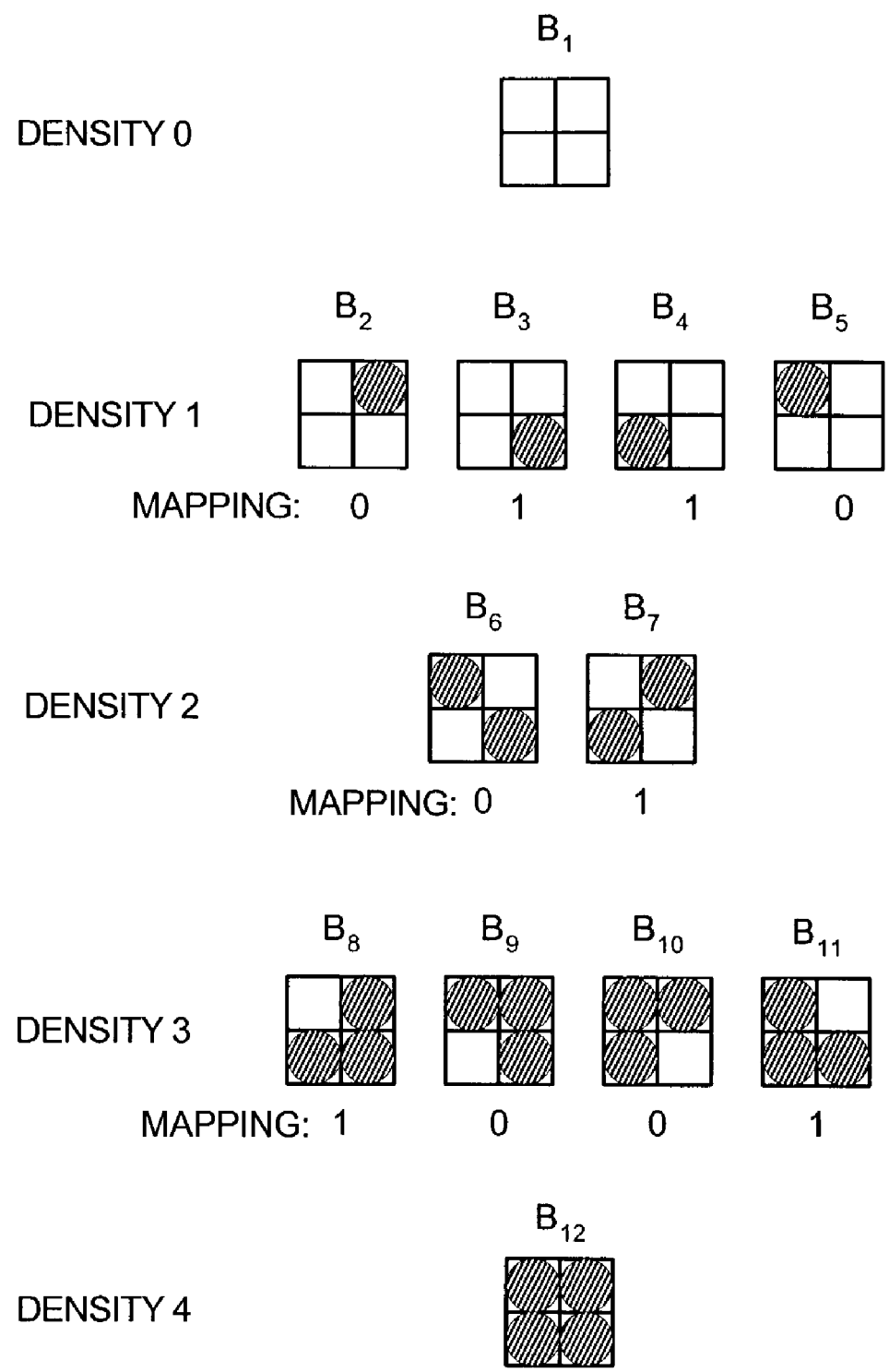
FIG. 2 is a representation of halftone mappings suitable for use in conjunction with the method represented in FIG. 1.

A set of M by N code blocks $B_c$ is initialized 105. Code blocks $B_c$ are used to replace codable blocks in the digitized image. At least one uniform density $d_u$ from 1 to D-1 is provided with a plurality of code blocks having different patterns having the same overall or average density $d_u$, so that a code symbol (e.g., a binary bit) can be encoded by selecting one or other of the different patterns for that density. If code blocks are not provided for a density $d_u$ from 1 to D-1, blocks in the digitized image having that density are considered uncodable. For example, when D=4, M=2, and N=2, one configuration of the present invention utilizes the mapping illustrated in FIG. 2, where the 2×2 grids each represent blocks of four pixels, and where darkened pixels have density D and undarkened pixels have density 0. (In this configuration of the present invention, the shape of the darkened pixels is a design choice that can be left to a technician. In FIG. 2, darkened pixels are represented by shaded circles.) In the illustrated configuration, each pixel in $B_1$[t,u], where t is an integer ranging from 0 to M−1 and u is an integer ranging from 0 to N−1, is set to 0. Thus, block $B_1$ has an overall density of 0 and can be used to represent white blocks of a drawing. On the other hand, each pixel $B_{12}$[t,u] is set to 4. Thus, block $B_{12}$ has an overall density of 4 and can be used to represent black blocks of the drawing. (Code blocks $B_1$ and $B_{12}$, corresponding to densities 0 and D, respectively, are included in FIG. 2 to illustrate that only one pattern is available for each density. Blocks $B_1$ and $B_{12}$ are not used for the coding of a watermark.)

In the present configuration, four different blocks $B_2$, $B_3$, $B_4$, and $B_5$ can be used to represent blocks area of the drawing having a uniform density equal to 1. Each darkened pixel in FIG. 2 represents a pixel having a density of 4, whereas each undarkened pixel represents a pixel having a density of 0. Thus, each block $B_2$, $B_3$, $B_4$, and $B_5$ has an average density of 1 and can be substituted for a block of the drawing in which all of the pixels have a density 1. When the drawing is reproduced utilizing this substitution, a halftone effect is produced that closely mimics the original drawings.

In the illustrated configuration, $B_2$[1,0]=4, $B_3$[1,1]=4, $B_4$[0,1]=4, $B_5$[0,0]=4, and all other pixels of $B_2$, $B_3$, $B_4$, and $B_5$ are set to 0. Thus, although blocks $B_2$, $B_3$, $B_4$, and $B_5$ have the same density, they have different halftone patterns. This choice is used to advantage to generate a mapping between the patterns and a watermark code. In the present configuration, an arbitrary mapping is selected in which either $B_2$ or $B_5$ can be used to represent "zero" and either $B_3$ or $B_4$ can be used to represent "one." A similar arbitrary mapping is used for blocks $B_8$, $B_9$, $B_{10}$, and $B_{11}$, all of which have average density 3. Blocks $B_6$ and $B_7$ having average density 2 are also mapped into 0 and 1, respectively. (Other patterns having an average density of 2 are not utilized in this configuration.)

Returning to FIG. 1, a loop is set up 106, 108, 110, 112, 114 to step through the digitized image block by block (as opposed to pixel by pixel). Thus, in one configuration, counters p and q are initialized 106 to zero, and increments pstep and qstep for p and q, respectively, are initialized. A test is performed to determine 108 whether p is greater than or equal to W, the width of the image in pixels. If so, the watermarking procedure has finished its job 110. Otherwise, a test is performed to determine 112 whether q is greater than or equal to H, the height of the image in pixels. If so, p is incremented 114 by pstep and q is set equal to 0 and execution returns to test 108. Otherwise, execution continues with the body of the loop.

In one configuration, the body of the loop increments 116 a counter h and performs a test 118 on pseudorandom generator K(h) to determine whether the current block is to be encoded with a watermark symbol. If not, q is incremented 120 by qstep and execution continues with test 112. Otherwise, the remainder of the body of the loop is executed. (In another configuration in which pseudorandom generator K(h) is neither used nor initialized, steps 116, 118 and 120 are omitted and execution proceeds directly from test 112 to step 122.)

Tests are performed to determine whether the current block of the digitized image are codable, i.e., whether the current multipixel block can be replaced by a coded block having a coded value of zero or one, in accordance with a digitized watermark. A codable block is one in which every pixel of the block has the same density (a common occurrence in low-detailed images), and this density is neither a minimum density 0 nor a maximum density D, as these densities each have only one possible representation as a halftone pattern (see FIG. 2).

For simplicity, one configuration of the present invention selects 122 one pixel from the current image block and stores its density in variable tpixel. The value of tpixel is then tested 124 to determined whether it is 0 or D. If it is, either the entire current image block has density 0 or D or the densities of the pixels in the block are nonuniform. In either case, the block is noncodable, so it is not replaced, and execution resumes at step 120 to step to the next block of the image.

Densities 0 and D are uncodable because there is only one possible representation of either density as a halftone patterns. However, the invention does not require that every other possible density have a plurality of halftone representations in the set of code blocks B, as long as there is at least one density having a plurality of halftone representations and a sufficient number of codable blocks in the image. In such a configuration, blocks with pixels having densities that are not represented by a plurality of halftone representations are also deemed to be uncodable.

If tpixels is not 0 or D, a loop is set up to determine whether all of the pixels in the block have the same density, or, in other words, to determine whether the block has uniform density. In one configuration, variables r and s are each set 126 to zero, and a test is performed 128 to determine whether r is greater than or equal to M. If so, the body of the test has determined that the pixels are uniform and that the block can be replaced with a coded block B. Otherwise, a test is performed to determine 130 whether s is greater than or equal to N. If the test succeeds, r is incremented 132, s is set to zero, and execution continues at test 128. Otherwise, a test is performed 134 to determine whether the pixel P[r+pindex,s+qindex] has a density value different from tpixel. If it does, the current digitized image block is uncodable and execution continues at step 120 where q is incremented to proceed to the next block of the image. Otherwise, s is incremented 136 and execution continues at test 130, so that each pixel of the current image block is tested.

As indicated above, when all of the pixels of the current block of the digitized image are the same density, and this density is neither 0 nor D (nor any other density, if any, that is not represented by a plurality of patterns in the set of image blocks B), the current block of the image is considered codable. In this case, a block $B_w$ is selected 138 that has an overall (i.e., average) density equivalent to tpixel and a pattern corresponding to the current bit of the watermark, i.e., W[g]. For example, and referring to the coding illustrated in FIG. 2 in which the value of a bit represented by a block $B_w$ is shown below the representation of the block pattern, if W[g]=1 and tpixel=2, block $B_7$ is selected. If W[g]=0 and tpixel=2, block $B_6$ is selected. If W[g]=0 and tpixel=1, either block $B_3$ or block $B_4$ is selected. In the latter case, a choice between $B_3$ and $B_4$ may be made either systematically or pseudorandomly. In one configuration, adjoining blocks in the image are analyzed and a choice between $B_3$ and $B_4$ is made to minimize the appearance of interference patterns in the watermarked image, or in accordance with one or more other criteria. To perform the substitution, q and r are each set to zero and a loop 140, 142, 144 and 146 is executed to set 146 each of the pixels in the current image block to the value of a pixel in a corresponding position in the selected block, $B_w$. The loop performing the replacement terminates when r is greater than or equal to M at step 140. At this point, q is incremented 120 by qstep, thereby stepping the watermarking procedure to the next block of the image.

Blocks of the digitized image that are not codable are replaced by bits from a coding block B. However, in one configuration of the present invention other than the one illustrated in FIG. 2, a single block in the set of halftone blocks B is provided for one or more of the densities between 1 and D−1. Although blocks in the image having these densities are considered uncodable in this configuration, image blocks that uniformly have these densities can be (but are not required to be) replaced by the halftone block having the corresponding density.

In yet another configuration of the present invention, the mapping of the set of block B to the binary watermark code is changed systematically or pseudorandomly while the digitized image is being watermarked to make it more difficult for someone without knowledge of the watermark to discern its value or even its presence in the watermarked image.

Although it is desirable that M evenly divide W and that N evenly divide H, it is not an absolute requirement. In one configuration of the present invention, at least one of M or N does not evenly divide W or H, respectively. In this configuration, tests 108 and 112 and/or the initializations of step 106 are modified to avoid selecting blocks that are outside the pixel array bounds of the digitized image. One or more image strips (e.g., at a border of the image) are not analyzed for watermarking. The pixels in these strips are simply retained from the digitized image and are not replaced by watermark codes.

Watermark W is, in one configuration, a predetermined sequence of bits. For example, if the watermark is 10000101100010100111 . . . , W[1]=1, W[2]=0, W[3]=0, W[4]=0, W[5]=0, W[6]=1, W[7]=0, etc. The watermark can be any stream of bits long enough to be considered a secure identification and to resist a "brute force attack" by someone determined to find, remove, or alter the watermark. In one configuration, for example, a watermark of at least 128 bits is utilized. The watermark may contain an encrypted authentication message, for example, an encrypted ASCII text string. It is usually necessary that a sufficient number of codable blocks exist in an image to allow for the entire watermark W to be embedded in an image, although embedding a portion of the watermark may be sufficient if only authentication of an image is required. If the watermark "runs out" at step 138 (i.e., the incremented value of g in step 138 exceeds the length of watermark W), watermark W may be repeated by any of a number of simple expedients, such as replacing the incremented value of g with 1 or stepping backwards through the watermark instead of forwards.

In one configuration of the present invention, watermark W contains a synchronization pattern that allows a searching algorithm to easily find the location of the watermark in a watermarked image.

In yet another configuration of the present invention, the image is a multi-color halftone image. In this case, the digitized image represents a plurality of colors, preferably primary colors. Each color in the digitized image can be used as a separate monochrome image that can receive a watermark. The watermarks for each color may be, but need not be the same. In one configuration, each color receives a different watermark.

Figure 3:
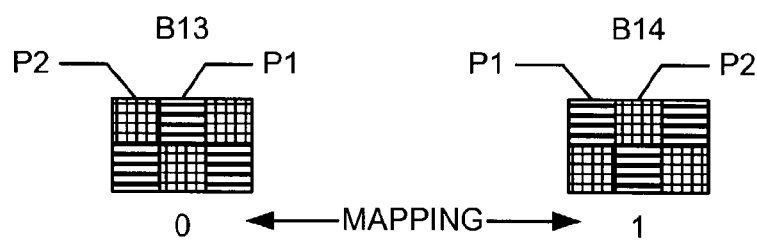
FIG. 3 is a representation of one color of a color-tone mapping suitable for use in watermark embedding.

In yet another configuration and referring to FIG. 3, the image to be watermarked is a color image, and color tone rather than halftone coding is used for watermark embedding. For example, block combinations of blue pixels P1 and yellow pixels P2 that yield green, such as those in blocks $B_{13}$ and $B_{14}$ in FIG. 3, are used to encode blocks within a green region. (The numbering of blocks $B_{13}$ and $B_{14}$ in FIG. 3 is not intended to imply any relationship between blocks $B_{13}$ and $B_{14}$ and blocks $B_1$ through $B_{12}$ of FIG. 2 or the configurations illustrated by FIGS. 2 and 3.) Blocks $B_{13}$ and $B_{14}$ are small enough to be perceived as green instead of as a combination of blue and yellow pixels. Other block combinations are utilized to encode other colors. Thus, to encode a color image, a computer would step through multipixel blocks of a digitized color image having regions of a plurality of different colors; analyze the multipixel blocks of the digitized image to determine whether the multipixel blocks of the digitized image are replaceable with coded blocks of a watermark code, the replaceable multipixel blocks thereby being codable blocks, and substitute coded blocks indicative of a watermark for codable blocks of the digitized image. In one configuration, the substituting comprises substituting blocks having coded patterns of colored pixels, such as those represented in FIG. 3.

In yet another configuration of the present invention, the plurality of patterns that represent each density are utilized to encode nonbinary symbols. (By definition, bits are considered binary symbols. Nonbinary symbols are symbols that convey more information per symbol than can be conveyed by a single bit. For example, the letters "a," "b," "c," and "d" form a group of non-binary symbols that happen to convey two bits of information each. The letters "a," "b," and "c" form a group of nonbinary symbols that convey more than one, but less than two bits of information each.) For example, $B_2$ and $B_5$ of FIG. 2 are utilized to represent different symbols "a" and "b" rather than being used to represent alternative codings of "0", and $B_3$ and $B_4$ are similarly used to represent different symbols "c" and "d" rather than alternative codings of "1". $B_8$, $B_9$, $B_{10}$, and $B_{11}$ are also mapped into symbols "a," "b," "c," and "d" rather than "0" and "1," and four different codings of density 2 are utilized. The watermark in this configuration is represented as a sequence of nonbinary symbols. For example, W is "aabacdddaccbbbb . . . ".

Referring to FIG. 4, a digitized representation 200 of a digitized pixel array resulting from a very small black and white image is shown. (It will be understood that most images will contain more pixels than this example, but representation 200 will suffice for the purpose at hand.) White pixels are shown in the array as having pixel value 0, and black pixels are shown as having pixel value 4. Intermediate densities are shown as 1, 2, and 3. Thus, a pixel representing 25% gray is shown as 1, a pixel representing 50% gray is shown as 2, and a pixel representing 75% gray is shown as 3. For this example, D=4, M=2, and N=2. The pixel blocks in the image resulting from this selection are indicated by the heavy lines in the grid.

Using the coding shown in FIG. 2 and a watermark W of 1000010110001010011110000101100001, the watermarked digitized pixels shown in FIG. 4 are changed to the pattern shown in FIG. 5. Utilizing flow chart 100 of FIG. 1, replacement of blocks begins at the block having the pixel at location p=1, q=1 in its upper left corner. Block replacement continues down (in the q direction) and when the block at the bottom of a column of blocks is reached, the next column of blocks to the right is begin at the top. Identifying blocks by the (p,q) pixel location in the upper left corner of the block, blocks at (1,7), (1,9), (1,11), (3,1), (5,5), (7,7), (7,9), (8,11), (15,1), (15,3), (15,5), (15,7), (15,9), (15,11), (17,1), (17,3), (17,5), (17,7), (17,9), (17,11), (19,1), (19,3), (19,5), (19,7), (19,9), and (19,11) are uncodable. Pixels of other blocks have been changed to embed the watermark. Note that, because of the plurality of patterns provided, blocks at (5,1) and (9,5), for example, both contain watermark values of 1, even though the patterns of these blocks are different.

Although it is less apparent from a small image such as that represented in FIGS. 4 and 5, when the pixels of FIG. 5 are translated into a printed image, the image is not perceptibly different from that produced by the pixels of FIG. 4 because the blocks are so small that they are perceived by their average density. However, the watermark can be recognized readily if the digitized, watermarked image is copied. If the location of the watermark is known, a printed version of the digitized, watermarked image can be examined and carefully compared to a printed version known to have the watermark embedded. Watermarks can also be decoded to learn their content. The same watermark may appear repeated several times in a drawing to reduce decoding errors, or an error correction code may be applied to the watermark before it is used to watermark a drawing.

In another configuration of the present invention, pixels are mapped into a code representing a letter or other symbol selected from a predetermined group of letters or symbols having different apparent densities when printed. For example, in one configuration, the method includes replacing pixels of a digitized image with a code representing a symbol having an apparent printed density corresponding to the density of the replaced pixel, and selecting the symbol for the replacement from a plurality of symbols having equivalent printed densities depending upon a watermark symbol being encoded at a location of a replaced pixel. Thus, in one configuration, pixels of density 1 are mapped into a code representing the letter "J" or "L," depending upon whether a corresponding watermark bit is "0" or "1." Pixels of density 2 are mapped into a code representing the letter "H" or "K", depending upon whether the corresponding watermark bit is "0" or "1." Pixels of density 3 are mapped into a code representing the bold letter "W" or "M" depending upon whether the corresponding watermark is "0" or "1." Each pixel is mapped into a coded symbol in one configuration of the present invention, so that there is no need to divide an image into blocks containing more than one pixel. When these images are printed, very small printed letters are used in place of halftone dots at each pixel location.

Figure 6:
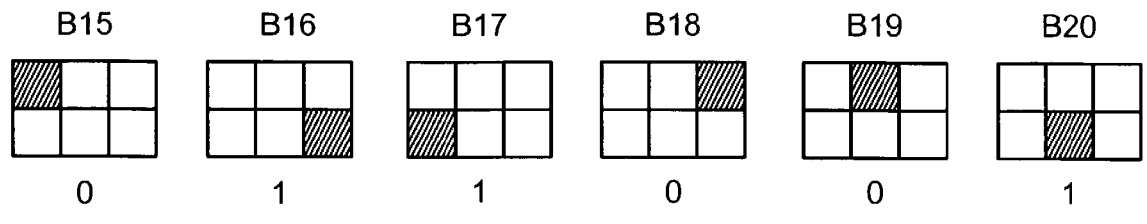
FIG. 6 is a representation of another configuration of a halftone mapping that is particularly suitable during creation of an image or for images that do not require exact color mapping.
Figure 6:
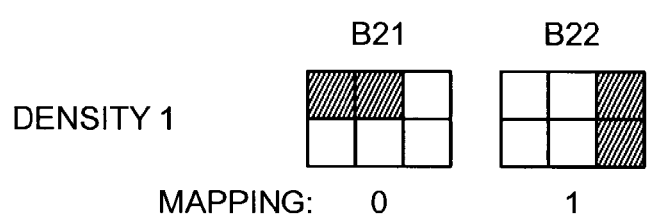
Figure 6:
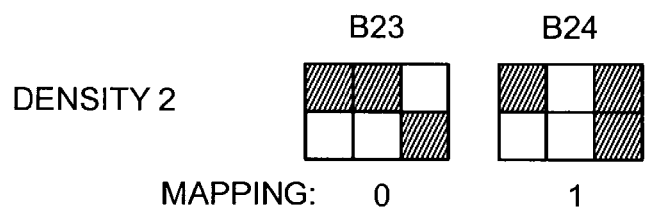
Figure 6:
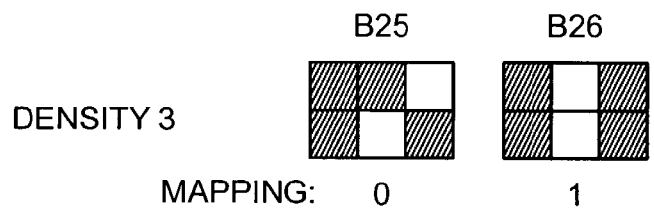
Figure 6:
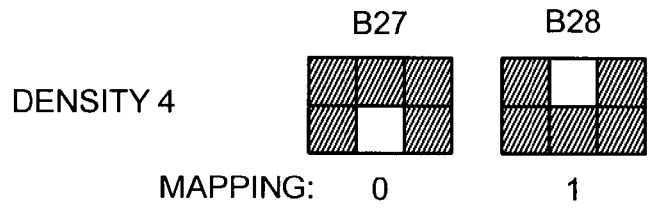

In yet another configuration of the present invention and referring to FIG. 6, D<(M×N) is set such that densities 0 and/or D are also codable. For example, the coding configuration shown in FIG. 6 with M=3 and N=2 and D=4. Density 0 is represented by blocks $B_{15}$, $B_{16}$, $B_{17}$, $B_{18}$, $B_{19}$, and $B_{20}$, which each contain one dark pixel out of six. Density 1 by blocks $B_{21}$ and $B_{22}$, which each contain two dark pixels out of six, etc., up to density 4, which is represented by blocks $B_{27}$ and $B_{28}$, which contain five dark pixels out of six. (The numbering of blocks in FIG. 6 is not intended to imply any relationship between the configuration represented in FIG. 6 and any other Figure.) Note that neither density 0 nor density 4 in this example is represented by a completely light or completely dark block of pixels, so that densities 0 and D are both codable in this configuration.

Configurations such as the one represented in FIG. 6 are particularly advantageous for watermarking during creation of an image or in configurations in which exact color or density mapping is not required.

Figure 7:
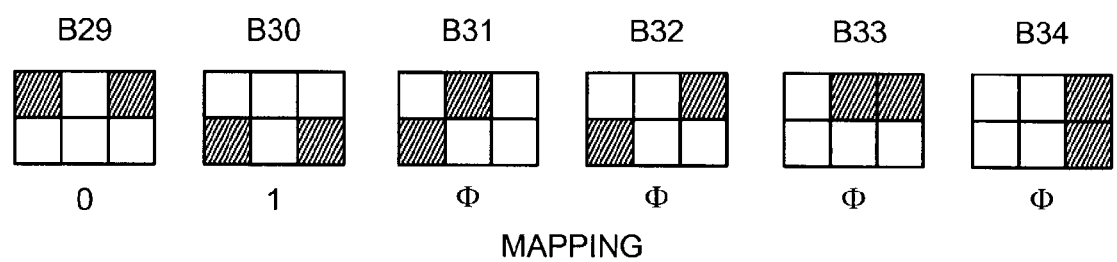
FIG. 7 is a representation of a mapping of one density level in which only selected pattern variations in that density level correspond to watermark bits and other pattern variations in that density level are not mapped.

In still another configuration of the present invention and referring to FIG. 7, only selected pattern variations are coded in one or more density levels and the remaining variations are not coded (e.g., defined as null, φ). Thus, in FIG. 7, the light and dark pattern of pixels in block $B_{29}$ is mapped to 0 and the light and dark pattern of pixels in block $B_{30}$ is mapped to 1. Blocks $B_{31}$, $B_{32}$, $B_{33}$, and $B_{34}$ are not mapped or coded. (The numbering of blocks in FIG. 7 is not intended to imply any relationship with the blocks or configurations illustrated in other Figures.) Coding or mapping configurations in which only selected pattern variations are coded for one or more density levels are particularly advantageous in configurations in which the original, unwatermarked image is in halftone mode, or for dealing with boundary blocks in configurations in which the best visual quality is sought. For example, null variations can be randomly selected and inserted in a drawing in selected locations in lieu of a coded block, for example, when a key in a key array indicates that a watermark code should not be used for a block. The selected locations may also (or alternately) include locations at which substitution or use of a null variation is necessary to obtain the best visual quality. In the latter case, the coded block that is not used is simply substituted at another location (e.g., the next location) at which the substitution produces an acceptable visual quality.

Figure 8:
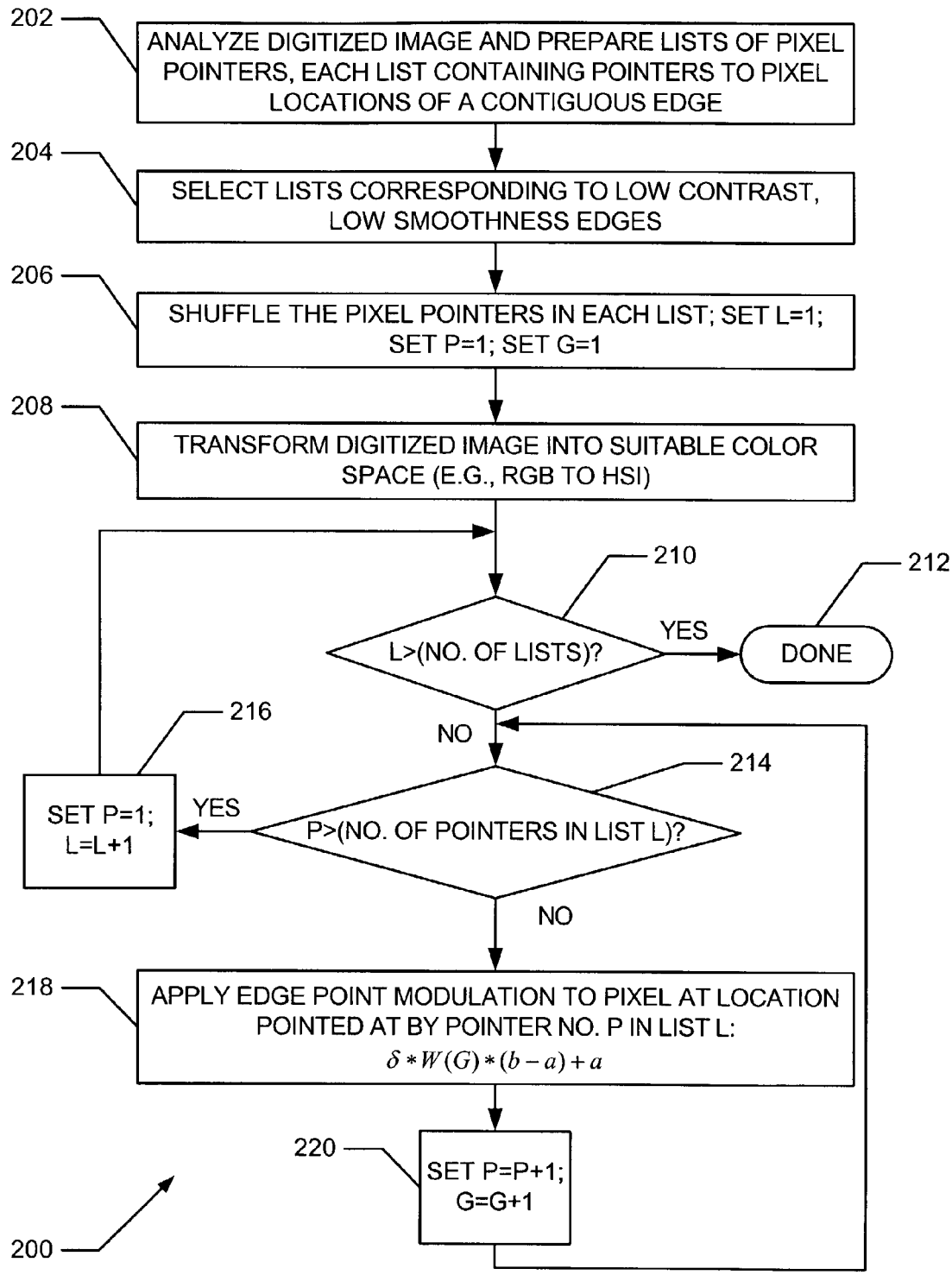
FIG. 8 is a flow chart representing a method for electronically embedding a watermark in a low texture image utilizing edges in the image.

In another configuration of the present invention and referring to flow chart 200 of FIG. 8, a method for watermarking a low texture image having low contrast, non-smooth edges. This configuration takes advantage of the fact that the data hiding capacity along edges that are non-smooth (e.g., angular, or curved and having a relatively small radius of curvature) and low contrast is higher than the capacity along edges that are smooth (e.g., straight, or curved and having a larger radius of curvature) and high contrast. First, a digitized image is analyzed 202 utilizing known image processing techniques to obtain lists of pixel pointers that point to pixel locations along a contiguous edge in the digitized image. (As used herein, an "edge" is a one-pixel wide discontinuity in a drawing, i.e., a location at which a pixel immediately adjacent to the edge in a direction normal to the edge is a different color and/or density than the pixel in the edge.) Known image processing techniques are also utilized to select 24 lists of edge points corresponding to low contrast, low smoothness edges, or portions of lists corresponding to portions of edges having low contrast and low smoothness. In one configuration of the present invention, the lists of pointers that correspond to each selected edge are shuffled 206 in a known, pseudorandom manner, so that the shuffling can be undone when decoding the watermark, and counters L, P, and G are set up for iterating through the lists and a watermark data stream W. Shuffling and unshuffling of pixel lists are not essential for practicing the invention, however.

The digitized image is transformed 208 into a suitable color space. For example, an RGB image is transformed into an HSI image, which has empirically found to provide better watermark data hiding than RGB images. This transformation is performed before prior to analyzing the digitized image in some embodiments, depending upon the image processing techniques used to perform edge searching and classification. However, as with shuffling, transformation of the image from one color space to another is not essential for practicing the invention, and digitized images in any color space (or monochrome images represented by grayscale pixel densities) may be utilized.

To iterate through the lists of edges in one configuration, a test is performed 210 to determine whether counter L has exceeded the number of available suitable low contrast, low smoothness edges. If so, the watermark embedding procedure 200 is complete 212. Otherwise, a test is performed to determine 214 whether counter P has exceeded the number of pixel pointers in the current list designated by counter L. If so, P is reset 216 to 1 and the next list of pointers is traversed by incrementing counter L. Execution then continues at test 210. Otherwise, an edge modulation is applied 218 to the pixel at the location pointed at by the pointer corresponding to counter P in list L.

Let us define e as the original pixel pointed to at step 218, $a(h1,s1,i1)$ as the color of the edge pixel and $b(h2,s2,i2)$ as the color of the adjacent pixel in a (preselected) "approximately normal" direction. (For example, "approximately normal," as used herein, can encompass an approximation in which the adjacent pixel is the pixel to the right of a pixel on a locally vertical edge, and in which the adjacent pixel is the pixel above a locally horizontal edge. If the edge at the pixel under consideration is locally neither horizontal nor vertical, the adjacent pixel is approximated by the pixel to the right or above the pixel under consideration, depending upon whether the edge is more nearly vertical or horizontal.) Thus, a and b are treated as quantities having values corresponding to the metrics used to describe color in the color space of the digitized image. In this example, HSI metrics are utilized because the digitized image is in an HSI color space when edge modulation is applied. If the digitized image is monochrome, quantities a and b are scalars; in a color space, a and b are vectors. (A monochrome image is considered to have a one-dimensional color space, and the color metric of a pixel is its density value.)

Pixel e is then replaced 218 with a new pixel e' having the (vector) value $\delta*W(G)*(b-a)+a$, where $\delta$ is a modulation level, i.e., a level that determines the magnitude of the watermark in the digitized image, and $W(G)$ is the Gth bit in the binary watermark stream W. After replacement, the next point in the (possibly shuffled) Lth list of edge points is accessed by incrementing P. In addition, the next watermark bit is made ready by incrementing G. If the entire watermark is exhausted, the procedure may be terminated, or the watermark repeated by any of the simple expedients referred to above. Otherwise, execution continues at test 214.

In one configuration of the method represented by flowchart 200, edges are classified by determining a contrast level C on both sides of the edge. If $C<\epsilon$, the edge is considered to have sufficiently low contrast for watermark embedding. A heuristic threshold $\epsilon$ is used in one configuration. A "Just Noticeable Difference" (JND) function is utilized to set the value of $\delta$ in one configuration.

Figure 9:
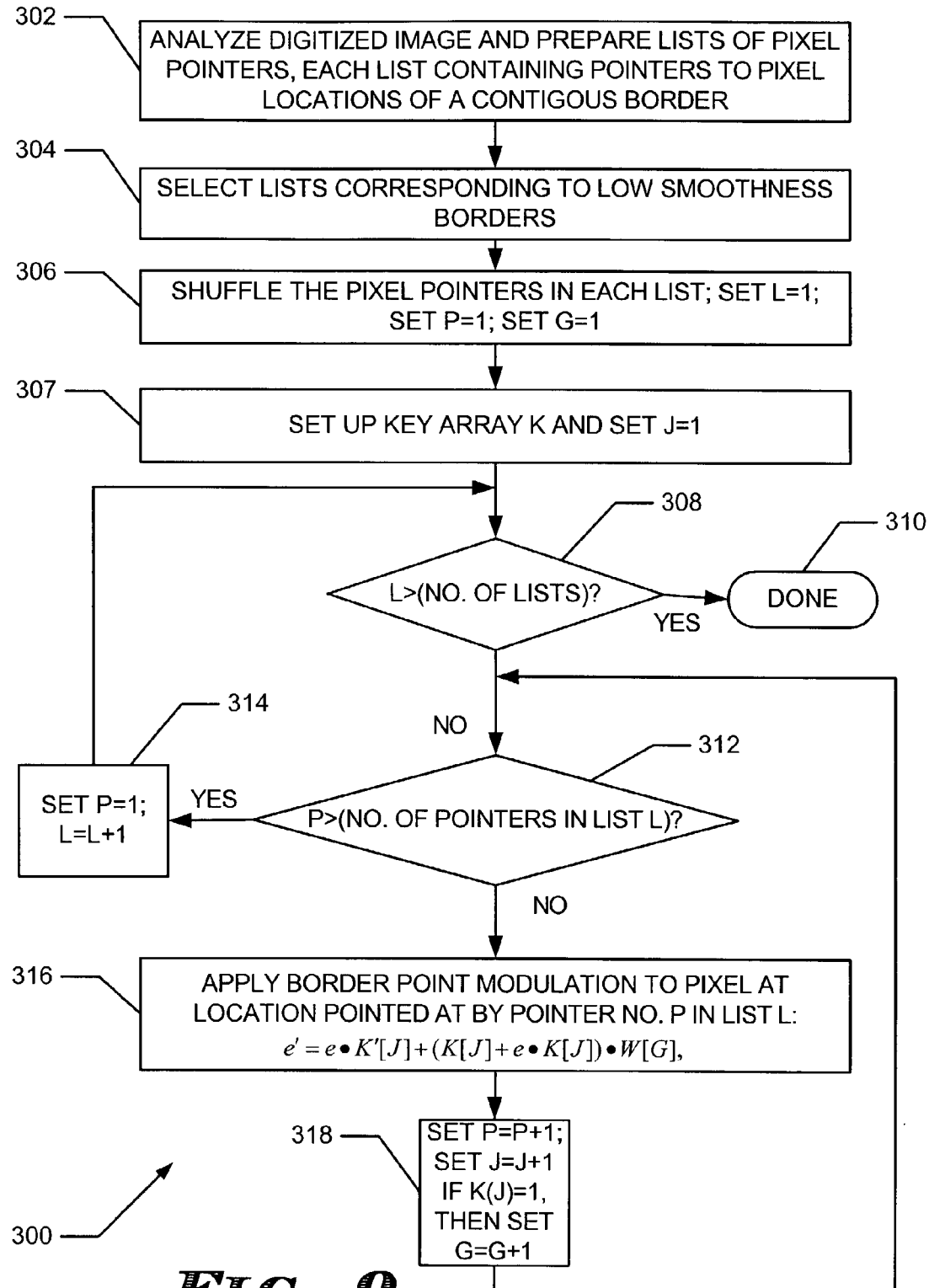
FIG. 9 is a flow chart representing a method for electronically embedding a watermark in a low texture image utilizing border lines within the image.

Often, comic strips, clip art, and other images include border lines that are many pixels wide rather than single pixel-wide edges. Therefore, in one configuration of the present invention and referring to flow chart 300 in FIG. 9, a method is provided that analyzes borders of an image rather than edges. Thus, in one configuration, using standard image processing techniques, a digitized image is analyzed 302 to prepare lists of pixel pointers, wherein each list contains pointers to pixel locations in a contiguous border, for example, a solid (not necessarily black) line between different colored regions of a comic strip or clip art image. Non-modifiable borders are removed by selecting only those lists 304 that correspond to low smoothness borders. The pixel pointers are then shuffled 306 in each list according to a pseudorandom sequence in a manner similar to that described in conjunction with flowchart 200, and counters L, P, and G are initialized. In this configuration as in the configuration of flowchart 200, the shuffling described in step 306 is not a required step for practicing the invention. A masking array K is initialized 307 so that each value K[J] has a value of 1 or 0 to indicate whether a particular border pixel is to be modulated or not. Masking array K is not required to practice the invention, but can serve as either a secret or a publicly available key to determine where a watermark is embedded in an image. If masking array K is not used, the value 1 should be substituted for K[J] in steps 316 and 318 and the value 0 should be substituted for K'[J] irrespective of J. In addition, there is no need to initialize or increment a counter J.

The method represented in flowchart 300 utilizes a similar iterative loop 308, 310, 312, 314, 316, and 318 to that described in conjunction with flowchart 300, but the body of the loop 316 employs border point modulation rather than edge point modulation. In border point modulation, each border pixel color value e under consideration is replaced by a value e'=e·K'[J]+(K[J]+e·K[J])·W[G], where K'[J] is the complement of K[J], e.g., if K[J]=1, then K'[J]=0, and if K[J]=0, then K'[J]=1. Also, K[J] is the Jth value in a key array K, and W[G] is the Gth watermark symbol from watermark stream W. In effect, the masking array K determines locations at which the watermark W[G] is applied. In step 318, the border point P and the masking array index J are both incremented. If the watermark W[G] has been applied (i.e., if K[J]=1), then G is also incremented, otherwise, G is not incremented. For example, J++; G=G+K[J].

Watermarking techniques can be classified into two categories, namely robust and fragile. Robust watermarks are often used for copyright protection. In many applications, robust watermarks utilize low bit rate embedding. Fragile watermarks, on the other hand, utilize a relatively higher embedding bit rate. Fragile watermarks can be used for authentication. Configurations of the present invention utilizing edge modulation and/or border line modulation are advantageous, for example, for image authentication applications utilizing fragile watermarks. For example, in one configuration in which a watermark of Z bits w={$w_1$, $w_2$, ..., $w_Z$} is to be embedded, a bit level repetition code is used to embed a watermark W'={$w_{11}$, $w_{12}$, ..., $w_{1Y}$, $w_{21}$, $w_{22}$, ..., $w_{2Y}$, ... $w_Z$} with $w_{11}$=$w_1$, $w_{12}$=$w_1$, ..., $w_{1Y}$=$w_1$, etc. In other words, each bit of W is repeated Y times to generate a watermark W' that is Y−1 times longer than W. In at least one configuration utilizing a repetition code, a normalization (synchronization) operation is performed at the beginning of decoding. In one configuration of the present invention utilized to watermark cartoon video, a repetition code is advantageously utilized due to the larger data hiding capacity of video compared to stationary images.

In another configuration of the present invention in which oblivious watermark detection is performed (i.e., the original image or the original watermark is not available to assist in authentication or decoding of a watermarked image), a synchronization mark is utilized. In one configuration in which a watermark embedding key is not used to determine where to place encoded watermark bits, a synchronization mark is used to facilitate detection of the encoded, embedded watermark. A watermark detector utilizes a synchronization mark locator, an edge detector configured to generate e'', an edge linker configured to generate e*, and a comparer configured to decode the watermark W'=e''⊕e*. The synchronization mark locator, edge detector, edge linker, and comparer in one configuration are implemented utilizing a general purpose processor controlled by a software and/or firmware program. Various edge detection and linking algorithms are suitable for this purpose. A number of image processing algorithms that may be used for these purposes are found in R. Gonzalez and R. Woods, *Digital Image Processing*, Addison-Wesley, 1993. In one configuration of the present invention, a Sobel edge detector and a Cunning edge linking algorithm are used.

Even in configurations in which the original image or the original watermark is known, and in configurations in which both are known, synchronization markers can be used to assist in detection of the watermark in an image believed to have an embedded watermark.

In one configuration of the present invention, to achieve greater robustness, a combination of two or more of the configurations described herein are utilized.

Each of the methods described herein may be practiced utilizing a general purpose stored program computer such as a personal computer, wherein the steps of the method are embodied in a stored computer program on a machine readable medium. The instructions may be stored locally or accessed via a network. The images in which watermarks are to be embedded may be entered directly into the computer utilizing a suitable graphics program or prepared externally (e.g., using pencil and/or ink and paper) and scanned in utilizing a optical scanner. The digitized images are then stored in a memory of the computer and are manipulated electronically by a processor of the computer utilizing the stored computer program, thereby producing a digitized representation of the watermarked image. The watermarked image may be transferred electronically for further use or it may be printed utilizing a printer having suitable resolution. Detection and decoding of the watermark can most readily be accomplished for images in either digital or printed form when knowledge of the location and code mappings are known. Decoding of printed images may most readily be accomplished by embedding small location markers in the drawing at known locations. In one configuration of the present invention, one or more of the embedding methods described above is utilized in conjunction with a drawing program to embed a watermark (and/or locator marks) in a drawing as it is being drawn. The drawing appearing on the computer screen produced by the drawing program is actively updated in the event pixel locations at which the watermark code can be embedded change as the drawing is modified.

It will thus be apparent to those skilled in the art that configurations of the present invention provide methods for watermarking of images, such as cartoon drawings and clip art, that lack sufficient texture for embedding of other types of watermarks. Moreover, the watermarks applied by configurations of the present invention do not produce perceptible degradation of images consisting of simple compositions of smooth regions. It is thus practical to provide watermark protection to many types of low texture images utilizing configurations of the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method for watermarking an image utilizing a computer, said method comprising utilizing the computer to:
   analyze a representation of a digitized image to determine contiguous edges of the image;

select edges for modulation in accordance with a data hiding criterion;

apply a watermark-dependent edge point modulation to pixels on the selected edges; and wherein said analyzing to determine contiguous edges produces lists of pixel pointers, each list containing pointers to pixel locations of a contiguous edge; and wherein said criterion selects lists corresponding to low contrast, low smoothness edges.

2. A method in accordance with claim 1 wherein said applying an edge point modulation comprises embedding a repetition coded watermark.

3. A printed watermarked image produced in accordance with the method of claim 1.

4. A method for watermarking an image utilizing a computer, said method comprising utilizing the computer to:

analyze a representation of a digitized image to determine contiguous edges of the image;

select edges for modulation in accordance with a data hiding criterion;

apply a watermark-dependent edge point modulation to pixels on the selected edges; and wherein said analyzing to determine contiguous edges produces lists of pixel pointers, each list containing pointers to pixel locations of a contiguous edge;

wherein said criterion selects lists corresponding to low contrast, low smoothness edges; and wherein said applying a watermark-dependent edge point modulation comprises replacing a pixel e of an edge with a new pixel e' having a value $\delta*W(G)*(b-a)+a$, where $\delta$ is a modulation level, $W(G)$ is the Gth bit in a binary watermark stream W, a is a value corresponding to a metric used to describe color in a color space of the digitized image for the edge pixel $_e$, and $_b$ is a value of an adjacent pixel in an approximately normal direction.

5. A method for watermarking an image utilizing a computer, said method comprising utilizing the computer to:

analyze a representation of a digitized image to determine contiguous edges of the image;

select edges for modulation in accordance with a data hiding criterion;

apply a watermark-dependent edge point modulation to pixels on the selected edges;

wherein said analyzing to determine contiguous edges produces lists of pixel pointers, each list containing pointers to pixel locations of a contiguous edge;

wherein said criterion selects lists corresponding to low contrast, low smoothness edges;

wherein said applying a watermark-dependent edge point modulation comprises replacing a pixel e of an edge with a new pixel e' having a value $\delta*W(G)*(b-a)+a$ where $\delta$ is a modulation level, $W(G)$ is the Gth bit in a binary watermark stream W, a is a value corresponding to a metric used to describe color in a color space of the digitized image for the edge pixel $_e$, and $_b$ is a value of an adjacent pixel in an approximately normal direction; and shuffle said pixel pointers pseudorandomly.

6. A method for watermarking an image utilizing a computer, said method comprising utilizing the computer to:

analyze a representation of a digitized image to determine border lines within an image;

select border lines for modulation in accordance with a data hiding criterion; and apply a watermark-dependent border point modulation to pixels in the selected border lines;

wherein said analyzing to determine border lines produces lists of pixel pointers, each list containing pointers to pixel locations of a border line; and wherein said criterion selects lists corresponding to low smoothness borders.

7. A printed watermarked image produced in accordance with the method of claim 6.

8. A method in accordance with claim 6 wherein said applying a border point modulation comprises embedding a repetition coded watermark.

9. A method for watermarking an image utilizing a computer, said method comprising utilizing the computer to:

analyze a representation of a digitized image to determine border lines within an image;

select border lines for modulation in accordance with a data hiding criterion; and apply a watermark-dependent border point modulation to pixels in the selected border lines;

wherein said analyzing to determine border lines produces lists of pixel pointers, each list containing pointers to pixel locations of a border line;

wherein said criterion selects lists corresponding to low smoothness borders; and wherein said applying a watermark-dependent edge point modulation comprises replacing a pixel e of an edge with a new pixel e' having a value $e'=e \cdot K'[J]+(K[J]+e \cdot K[J]) \cdot W[G]$, where $K[J]$ is the Jth value in a key array K, $K'[J]$ is the complement of $K[J]$, and $W(G)$ is the Gth watermark symbol from watermark stream W.

10. A method for watermarking an image utilizing a computer, said method comprising utilizing the computer to:

analyze a representation of a digitized image to determine border lines within an image;

select border lines for modulation in accordance with a data hiding criterion; and apply a watermark-dependent border point modulation to pixels in the selected border lines;

wherein said analyzing to determine border lines produces lists of pixel pointers, each list containing pointers to pixel locations of a border line;

wherein said criterion selects lists corresponding to low smoothness borders; and wherein said applying a watermark-dependent edge point modulation comprises replacing a pixel e of an edge with a new pixel e' having a value $e'=e \cdot K'[J]+(K[J]+e \cdot K[J]) \cdot W[G]$, where $K[J]$ is the Jth value in a key array K, $K'[J]$ is the complement of $K[J]$, and $W(G)$ is the Gth watermark symbol from watermark stream W; and shuffle said pixel pointers pseudorandomly.

* * * * *